US006694301B1

(12) United States Patent
Heckerman et al.

(10) Patent No.: US 6,694,301 B1
(45) Date of Patent: Feb. 17, 2004

(54) GOAL-ORIENTED CLUSTERING (75) Inventors: David E. Heckerman, Bellevue, WA (US); D. Maxwell Chickering, Bellevue, WA (US); John C. Platt, Bellevue, WA (US); Christopher A. Meek, Kirkland, WA (US); Bo Thiesson, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/540,255

(22) Filed: Mar. 31, 2000

(51) Int. Cl.[7] .................................................. G06N 5/02
(52) U.S. Cl. .............................. 706/45; 706/26; 706/20; 706/25
(58) Field of Search ................................ 706/45, 16, 20, 706/25; 324/772; 382/156; 712/10

(56) References Cited

U.S. PATENT DOCUMENTS

| 5,438,629 A | * | 8/1995 | Moed et al. ................. 382/156 |
| 5,625,751 A | * | 4/1997 | Brandwajn et al. ........... 706/20 |
| 5,638,491 A | * | 6/1997 | Moed .......................... 706/20 |
| 5,640,103 A | * | 6/1997 | Petsche et al. ............... 324/772 |
| 5,664,067 A | * | 9/1997 | Moed et al. .................. 706/25 |
| 5,734,796 A | * | 3/1998 | Pao .............................. 706/16 |
| 5,794,059 A | * | 8/1998 | Barker et al. .................. 712/10 |
| 5,974,404 A | * | 10/1999 | Moed et al. .................... 706/25 |
| 6,119,112 A | * | 9/2000 | Bush ............................ 706/25 |
| 6,134,537 A | * | 10/2000 | Pao et al. ..................... 706/16 |
| 6,408,290 B1 | * | 6/2002 | Thiesson et al. .............. 706/52 |

OTHER PUBLICATIONS

U.S. patent application Ser. No. 09/104,751, filed Jun. 25, 1998.
U.S. patent application Ser. No. 60/142,330, Heckerman et al., filed Jul. 3, 1999.

* cited by examiner

Primary Examiner—Wilbert L. Starks, Jr.
(74) Attorney, Agent, or Firm—Amin & Turocy, LLP (57) ABSTRACT

Clustering for purposes of data visualization and making predictions is disclosed. Embodiments of the invention are operable on a number of variables that have a predetermined representation. The variables include input-only variables, output-only variables, and both input-and-output variables. Embodiments of the invention generate a model that has a bottleneck architecture. The model includes a top layer of nodes of at least the input-only variables, one or more middle layer of hidden nodes, and a bottom layer of nodes of the output-only and the input-and-output variables. At least one cluster is determined from this model. The model can be a probabilistic neural network and/or a Bayesian network.

34 Claims, 4 Drawing Sheets

GOAL-ORIENTED CLUSTERING

FIELD OF THE INVENTION

The present invention relates to data clustering, also known as data segmentation, and more particularly to such clustering or segmentation that is oriented toward the goal of prediction.

BACKGROUND OF THE INVENTION

Data clustering is a useful technique for gaining insights from data sets that are large, such as purchase data from electronic commerce ("e-commerce") Internet web sites, Internet web site viewing data, etc. In this approach, the data can be considered as items, rows, cases, or records, having various features, variables, or columns. For example, items could be users, and features could be web page viewings on a news-oriented web site.

Items are generally clustered together such that items within a given cluster have similar features in some sense, and items with dissimilar features are within different clusters. Once clusters are formed by a given machine-learning algorithm or other technique, a data analyst can then inspect and examine the clusters to gain insights into the relationships among the data. For example, an analyst may learn that one cluster of web users frequent sports stories, another cluster of users frequent tabloid stores, etc. These insights can then be used for various purposes.

In many clustering applications, these purposes include making predictions. For example, a user's cluster might be used to predict what ads the user is likely to click on—that is, select. In general, when clusters are used to make predictions, it is usually important to distinguish features that are known at the time the predictions are made, which are referred to as input features or variables, from features that are to be predicted, which are referred to as output features or variables. For example, the stories on web pages read by a user could be considered the input variables, while the ads clicked on by the user could be considered the output variables.

In prior art modeling and clustering techniques, input and output variables are treated symmetrically. More specifically, the techniques explicitly or implicitly learn data models that are good estimations of the probability of inputs and outputs, which can be expressed as p(inputs, outputs). However, data analysts typically already have at their disposal the input data, such that they wish to predict output data. That is, rather than estimating the probability of inputs and outputs, analysts are usually more concerned with predicting the probability of outputs conditioned on the inputs, which can be expressed as p(outputs|inputs). For this and other reasons, there is a need for the present invention.

SUMMARY OF THE INVENTION

This invention relates to goal-oriented data clustering. In one embodiment, a computer-implemented method is operable on a number of variables that have a predetermined representation. The variables include input-only variables, output-only variables, and both input-and-output variables. The method generates a model that has a bottleneck architecture. The model includes a top layer of nodes of at least the input-only variables, one or more middle layer of hidden nodes, and a bottom layer of nodes of the output-only and the input-and-output variables. At least one cluster is then determined from this model.

Embodiments of the invention provide for advantages not found within the prior art. For example, models according to embodiments of the invention treat input and output variables asymmetrically. Variables that are input only (that is, only used for prediction) are represented by the nodes of the top layer of the model, and in one embodiment, are the only variables represented by the top-layer nodes. Variables that are output only (that is, which are only predicted) are represented by the nodes of the bottom layer of the model. Variables that can be either input or output variables, or both, (that is, used for prediction and/or are predicted) are represented at least by the bottom-layer nodes, and in one embodiment, also by nodes within the top layer of the model. Thus, for example, embodiments of the invention can provide for the estimation of p(output variables|input variables), in distinction to the prior art.

The invention includes computer-implemented methods, machine-readable media, computerized systems, and computers of varying scopes. Other aspects, embodiments and advantages of the invention, beyond those described here, will become apparent by reading the detailed description and with reference to the drawings.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as processing or computing or calculating or determining or displaying or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Operating Environment

Figure 1:
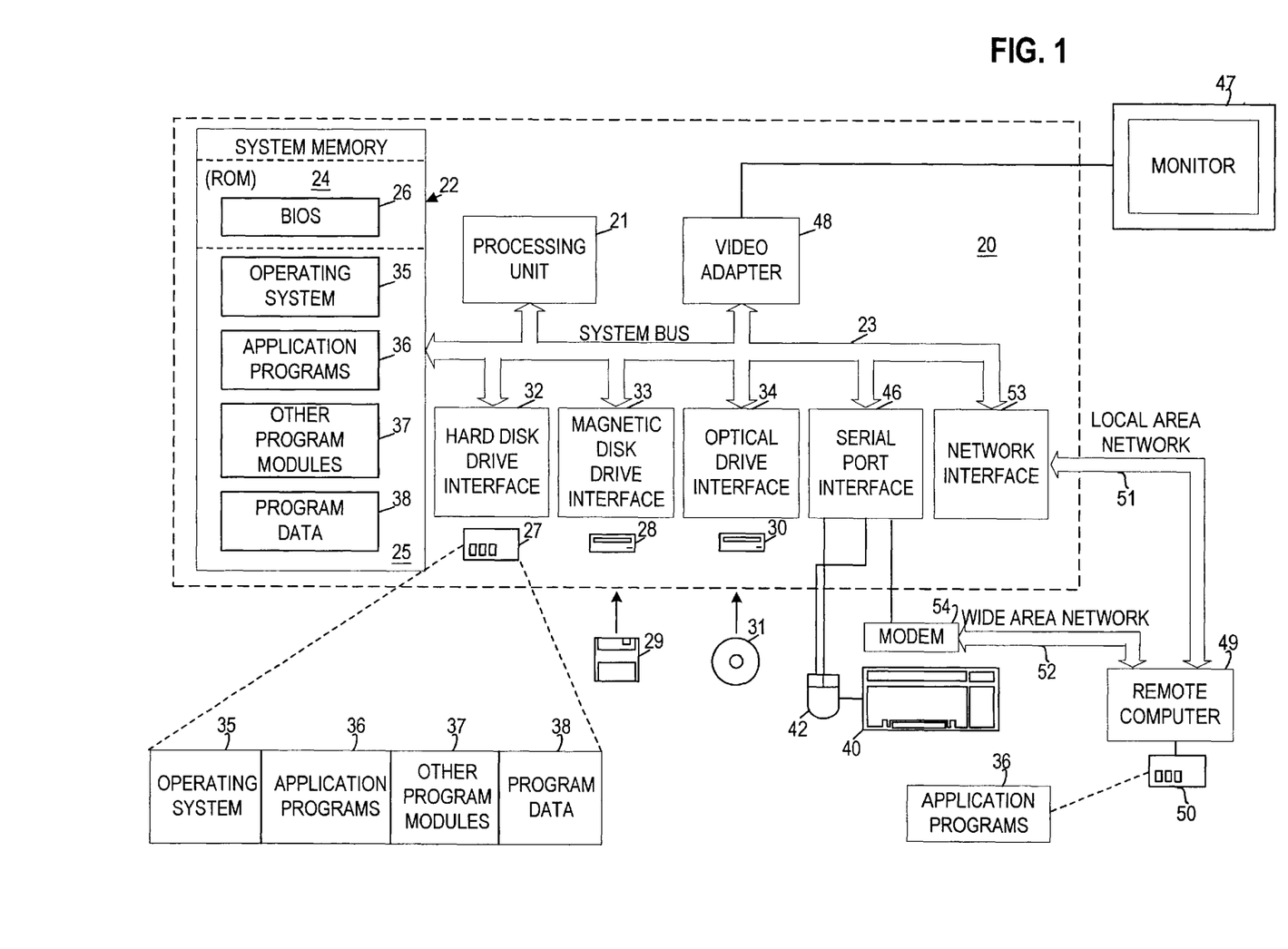
FIG. 1 is a diagram of an operating environment in conjunction with which embodiments of the invention can be practiced.

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PC's, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

Data Representation

In this section of the detailed description, data in conjunction with which embodiments of the invention can be utilized is described, as well as an example of what such data can represent. It is noted that the invention is not limited to any particular type of representation for the data that can be utilized with embodiments of the invention, however. The example representation described herein is for illustrative purposes only.

Figure 2:
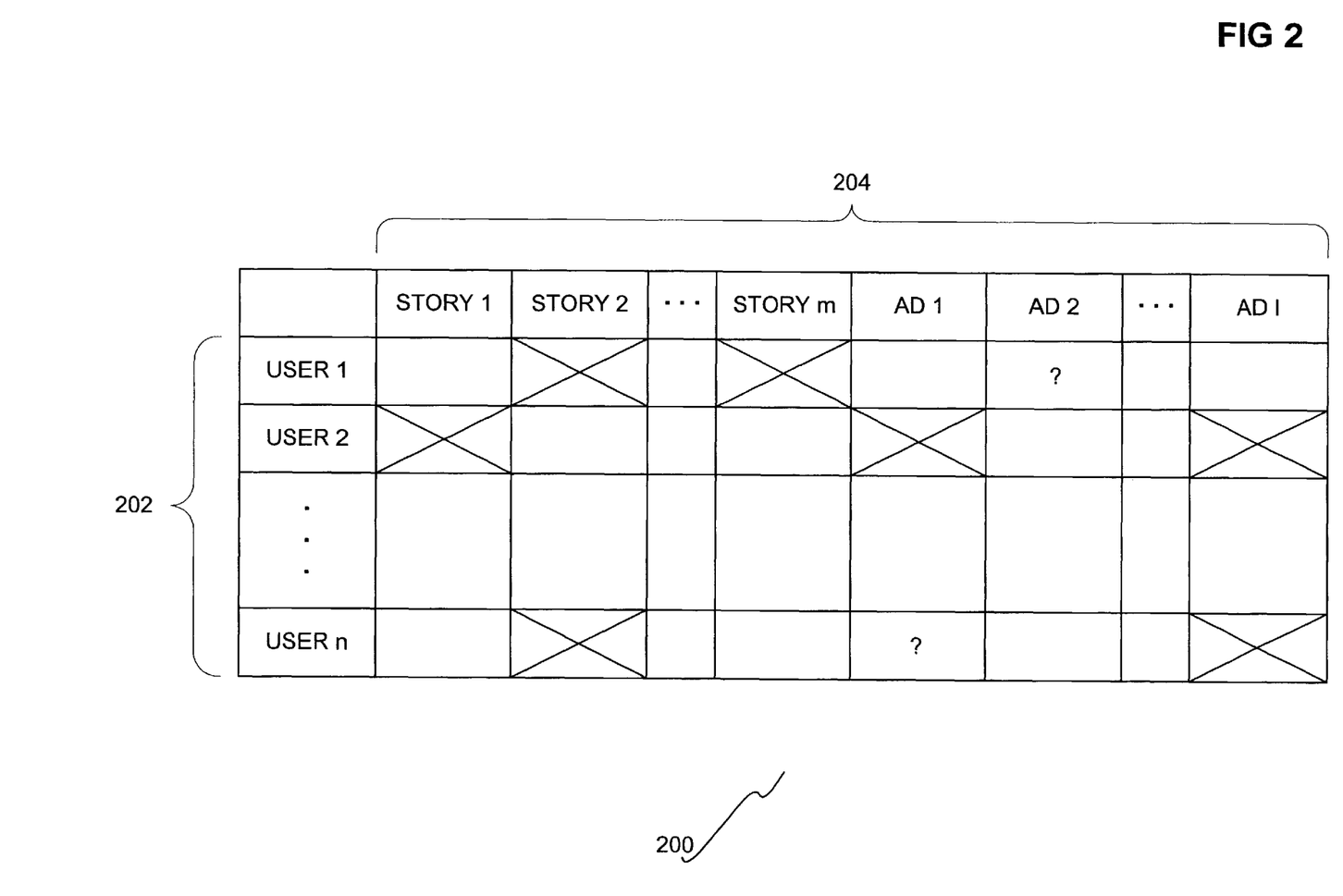
FIG. 2 is a diagram of a typical data set in conjunction with which embodiments of the invention can be practiced.

Referring to FIG. 2, a diagram showing data in conjunction with which embodiments of the invention can be practiced is shown. The data 200 is organized into a number of rows 202 and a number of columns 204. The rows 202 can also be referred to as records or items. The columns 204 can also be referred to as variables or features.

As has been described, what the data 200 represents is not particularly limited by the invention. However, as shown in FIG. 2, one example representation is that the data 200 represents the web viewing and ad selecting habits of Internet users. Specifically, the rows 202 correspond to a number of users 1, 2, . . . , n, while the columns 204 correspond to a number of stories 1, 2, . . . , m, that can be read by the users on a given web site, as well as a number of ads 1, 2, . . . , l, that can be: shown and selected, or clicked on or through, by the users; shown and not selected (or clicked on or through) by the users; and, not shown to the users.

The data of FIG. 2 is binary, with possible missing values for many of the ads, although the invention is not so limited. This means that for any particular user having a row within the rows 202 of the data 200, the user can have either one of two values for each of the columns 204 of the data 200. For example, for a particular story having a column within the columns 204, the user can have one value indicating that the user has read the story, or another value indicating that the user has not read the story. As shown in FIG. 2, the value that the user has read a story is indicated by an x in the appropriate box, while the value that the user has not read a story is indicated by an empty box. As another example, for a particular ad having a column within the columns 204, the user also can have one value indicating that the user has not been shown the ad (a value of "missing"), has been shown the ad and has selected it, or another value indicating that the user has been shown the ad and has not selected it. As shown in FIG. 2, the value that the user has been shown and selected an ad is indicated by an x in the appropriate box, while the value that the user has been shown and not selected an ad is indicated by an empty box, and, finally, the value that the user has not been shown an ad is indicated by a question mark ("?") in the appropriate box. Note that, as understood by those practiced in the art, missing data associated with ads are missing at random.

The variables of the columns 204 can be input variables, output variables, or both input-and-output variables. That is, each variable of the column 204 can be a variable used for predicting other variables only, in which case it is an input variable; a variable that is predicted based on other variables, in which it is an output variable; and, a variable that is used for predicting other variables as well as that is predicted based on other variables. As an example only, the stories having corresponding variables in the columns 204 may be input variables, in that the stories that the users have read are used only to predict other variables. Some of the ads having corresponding variables in the columns 204 may be both input-and-output variables, in that it is desired to both predict whether a given user is likely to click on an ad, as well as to use the ad to predict the selection of other ads. Other of the ads, conversely, may have corresponding variables in the columns 204 that may be only output variables, in that their selection is only predicted, and the ads themselves are not used to predict clicking of other ads. Ads in this latter group may, for example, ads that have click-through rates so small that they are not significantly useful as inputs.

Data such as the data of FIG. 2 may be very voluminous, for example, spanning tens of thousands of users, stories, and ads. Clustering models are therefore useful to determine clusters of rows or items within the data, based on the values of the variables for the rows. While the example described in this section is related to a particular domain, the invention itself is not so limited. Furthermore, embodiments of the invention are not restricted to binary data.

As has been described, clustering models can be used to make predictions. For example, based on what stories a given user has read and what ads the user has already selected, it may be desired to predict what other ads the user is likely to click on, so that these ads can be displayed to the user. Thus, other ads that have been selected with high frequency by users in the same cluster may be good candidate ads to show the user, and hence represent predictions made by the model. However, as has been indicated, within the prior art, clustering algorithms do not distinguish between input and output variables, and consequently they build models for the joint probability p(inputs, outputs) instead of the desired conditional probability distribution p(outputs|inputs). Although the conditional distribution can be derived from the joint, models constructed for the specific purpose of representing the conditional distribution tend to represent that distribution more accurately.

Models

In this section of the detailed description, models according to varying embodiments of the invention are described. The models are clustering models that allow for data, such as that which has been described in the previous section of the detailed description, to be segmented into different clusters, where records in a same cluster tend to have similar variable values. Unlike the prior art, models according to embodiments of the invention distinguish between output and input variables, such that estimations of probability of outputs conditioned on inputs can be more accurately made.

Figure 3:
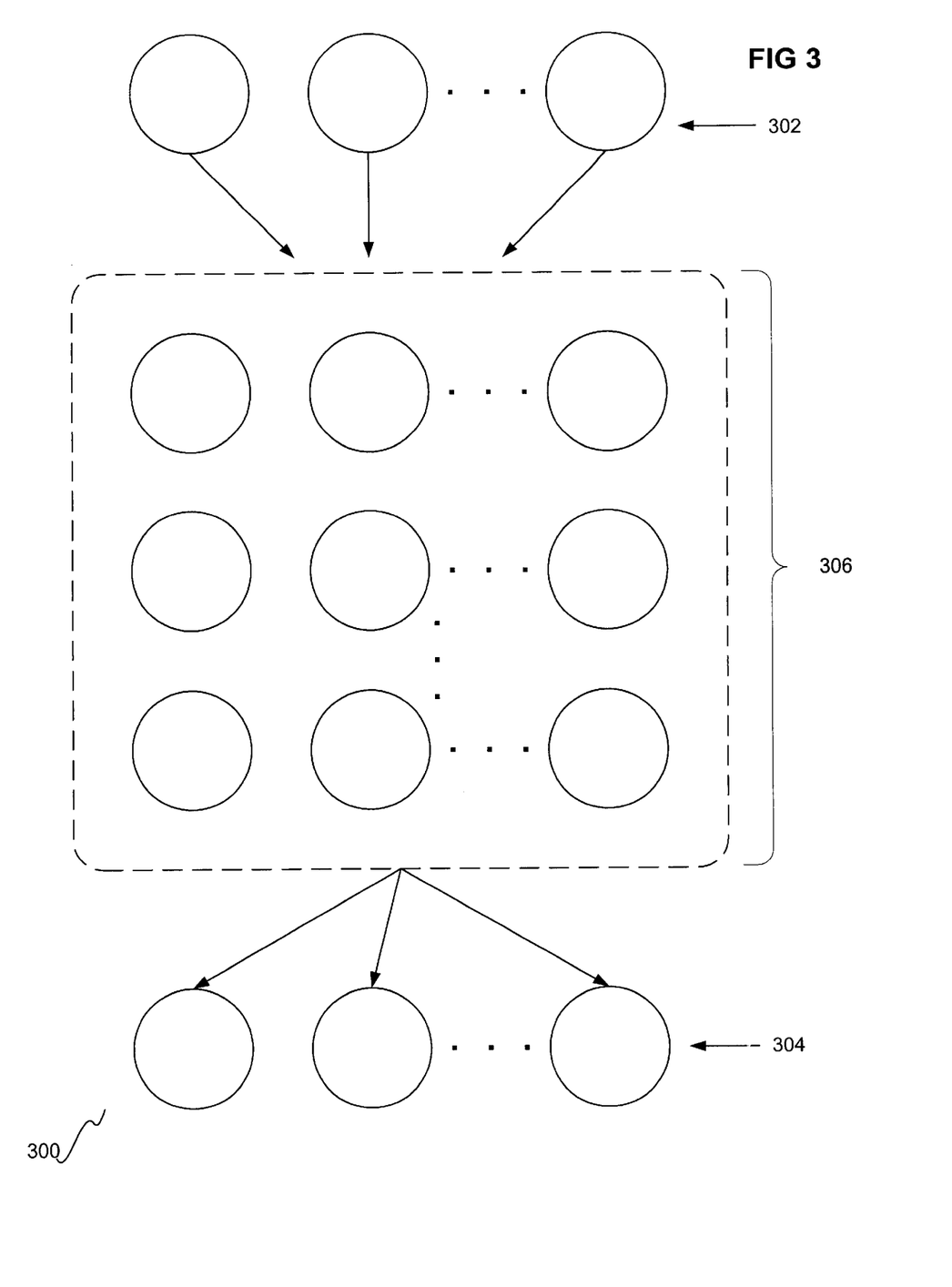
FIG. 3 is a diagram of a data clustering model according to an embodiment of the invention.

A diagram of a general model according to an embodiment of the invention is shown in FIG. 3. The model 300 of FIG. 3 includes a top layer 302 of nodes, a bottom layer 304 of nodes, and one or more middle layers 306 of nodes. The model 300 has what is referred to as a bottleneck architecture, in that there are more nodes within the top layer 302 and/or the bottom layer 304 than there are in any of the middle layers 306. The nodes within the layers 302, 304 and 306 are now described in terms of what they represent, in different embodiments of the invention.

In a probabilistic neural network, but non-Bayesian network, embodiment of the invention, each of the nodes within the top layer 302 represents either a corresponding input variable or a corresponding input-output variable, while each of the nodes within the bottom layer 304 represents either a corresponding output variable or a corresponding input-output variable. Because there are nodes in the top layer 302 that represent variables that can serve as output— e.g., input-output variables—the model 300 in this embodiment is not a Bayesian network. The model 300 in this embodiment can be used to predict the variables represented by the nodes in the bottom layer 304 based upon the variables represented by the nodes in the top layer 302. That is, the model 300 in this embodiment can be used to estimate p(outputs, input-outputs|inputs, input-outputs).

In a probabilistic neural network, Bayesian network embodiment, of the invention, each of the nodes within the top layer 302 represents a corresponding input variable, while each of the nodes within the bottom layer 304 represents either a corresponding output variable or a corresponding input-output variable. Because there are no nodes in the top layer 302 that represent variables that can serve as output, the model 300 in this embodiment is a Bayesian network. The model 300 in this embodiment can also be used to predict the variables represented by the nodes in the bottom layer 304 based upon the variables represented by the nodes in the top layer 302. That is, the model 300 in this embodiment can be used to estimate p(outputs, input-outputs|inputs).

For either of these or other embodiments of the invention, the middle layers 304 have nodes that are referred to as hidden nodes, which correspond to hidden discrete variables. The hidden nodes are hidden in that they represent hidden variables, which are hidden because they are never observed. The clusters are determined by a predetermined partition of possible states of the hidden nodes—that is, by a predetermined cross product of the states of the hidden nodes. For example, if there is one layer of hidden variables consisting of two binary variables, four clusters may be determined corresponding to the four possible assignments of states to the two binary variables. The number and particular partition of different states that can be utilized can be determined by trial-and-error, where each of a different number of states is tried, and various partitions tried, and tested against the data for accuracy. The number of different layers within the middle layers 306, as well as the number of nodes in any layer is not limited by the invention. For example, there may be only a single hidden node within a single middle layer 306, while there can also be a number of nodes within a number of middle layers 306.

Furthermore, not shown in FIG. 3 is that there may be arcs among nodes within the model 300. Specifically, an arc can exist between any two nodes in the same layer, as well as between any node within the top layer 302 and any node in the bottom layer 304, such that the resulting graph is acyclic. However, it is noted that arcs among nodes in the top layer 302 are not particularly useful for estimation of p(outputs|inputs), for example. An arc between a pair of nodes means that there is a relationship between these two nodes—that is, that the value of one of the nodes being set to a given value affects the value of the other node to some degree.

It is noted that unlike Bayesian networks, probabilistic neural networks, and other clustering models within the prior art, the models described in conjunction with FIG. 3 are asymmetric with respect to input, output and input-output variables. For example, symmetric treatment of input, output and input-output variables would be such that all of the variables would have nodes both in the top layer 302 of FIG. 3, as well as in the bottom layer 304, while embodiments of the invention contemplate different types of variables having nodes in different layers.

Solution Techniques

In this section of the detailed description, manners by which the models described in the previous section of the detailed description can be solved are presented. That is, manners by which the models described in the previous section are trained are presented. The techniques described in this section are indicated herein to apply to either or both of the probabilistic neural network/non-Bayesian network model described previously, and the probabilistic neural network/Bayesian network model also described previously.

For sake of brevity only, the former model is referred to as the "first" model, while the latter model is referred to as the "second" model.

First, as can be appreciated by those of ordinary skill within the art, either the first or the second model can be trained with a number of different techniques, such as the Generalized Expectation Maximization (GEM) approach, Monte Carlo methods, and the stochastic gradient descent approach, as are known within the art. The stochastic gradient descent approach is applicable provided that the probability distributions of the nodes are differentiable with respect to their parameters, as can be appreciated by those of ordinary skill within the art. A customized GEM approach according to an embodiment of the invention can be specifically utilized in the second model, and which is computationally efficient, when (1) there are no arcs among nodes in the same layer; (2) there is a single layer of hidden variable nodes with a relatively small number of nodes, such as on the order of ten; and, (3) the probability distribution for nodes in the bottom layer are discrete or linear Gaussian, as is now described.

As known within the art, the GEM approach is iterative, in that model parameters are initialized, and both the E and the M parts are iteratively performed until a predetermined convergence criterion is met. In the customized GEM approach according to an embodiment of the invention, the E part is the same as the E part of the GEM approach known within the art. In particular, a fractional data set is determined from the given data set as is now described. Where the input-only variables are represented as X, the hidden variable(s) as H, and the remaining variables as Y.

Initialize fractional data set to be empty
For each case (x, y) in the actual data set
For each state h of H
    Add case (h, x, y) to the fractional data set with
    fraction p(h|X, Y, current parameters)

Next, in the M part, which can be partial, new values are determined for the parameters that increase the likelihood p(all-data-y|all-data-x, parameters). For a Bayesian network, the optimization can be decomposed as follows:

Argmax p(all-y-data|all-h-data, parameters-for-y-given-h)
Increase p(all-h-data|all-x-data, parameters-for-h-given-x)

As can be appreciated by those of ordinary skill within the art, the Argmax optimization can be performed efficiently and in closed form for distributions from the exponential family, and the Increase optimization can be done with existing techniques such as line search, as known within the art.

It is noted that the custom modified GEM approach that has been described converges to a local maximum of the likelihood p(all-data-y|all-data-x, parameters). Furthermore, those of ordinary skill within the art can appreciate that the custom modified EM approach that has been described can also be used to determine a MAP solution—that is, parameters that maximize the posterior probability of the parameters, given the data.

Assigning Clusters

Once the model is learned, it can be used to assign items in the original or new data to clusters. There are two types of assignment: hard and soft.

In the case of hard assignment, the observations corresponding to an item are presented to the model, and the most likely cluster (i.e., partition of states) is determined using a probabilistic inference algorithm such as known within the art. The item is assigned to this cluster. Because hidden variables are not independent, not all possible clusters may be assigned items. For efficiency, the clusters that are not populated may be ignored.

In the case of soft assignment, the observations corresponding to an item are presented to the model, and the probability distribution over clusters is determined, again using a probabilistic inference algorithm. The item is then assigned fractionally to each cluster by a fraction equal to the probability of the cluster given the item's observations.

In a probabilistic neural network but non-Bayesian network containing a variable that is both an input and output variable, probabilistic inference is done under the assumption that the input and output versions of the variable are distinct variables.

Visualization

In this section of the detailed description, useful visualization techniques for the clustering models that have been described are presented, in accordance with embodiments of the invention. For a given cluster, in particular, two lists can be displayed. A first list is of input variable values, or value ranges for continuous variables, such that an item having a variable value in this list makes the item more likely to be in the cluster than before the value of this variable was known. For example, for a given user, a list of stories can be displayed such that if the user were to have read these stories, then the user is more likely to be in a given cluster.

A second list is of output variable values, or value ranges for continuous variables, that are likely when an item is in a cluster. For example, for a given user and a given cluster, a list of ads can be displayed that the user is likely to click on if the user is in the cluster. It is noted that both the first and the second lists can be generated, as can be appreciated by those of ordinary skill within the art, by solving a goal-oriented clustering model according to an embodiment of the invention, using a technique according to an embodiment of the invention, as both have been previously described in prior sections of the detailed description.

Methods

In this section of the detailed description, methods according to varying embodiments of the invention are described. The methods can be computer-implemented. The computer-implemented methods can be realized at least in part as one or more programs running on a computer—that is, as a program executed from a computer-readable medium such as a memory by a processor of a computer, such as the computer shown in and described in conjunction with FIG. 1. The programs are desirably storable on a machine-readable medium such as a floppy disk or a CD-ROM, for distribution and installation and execution on another computer.

Figure 4:
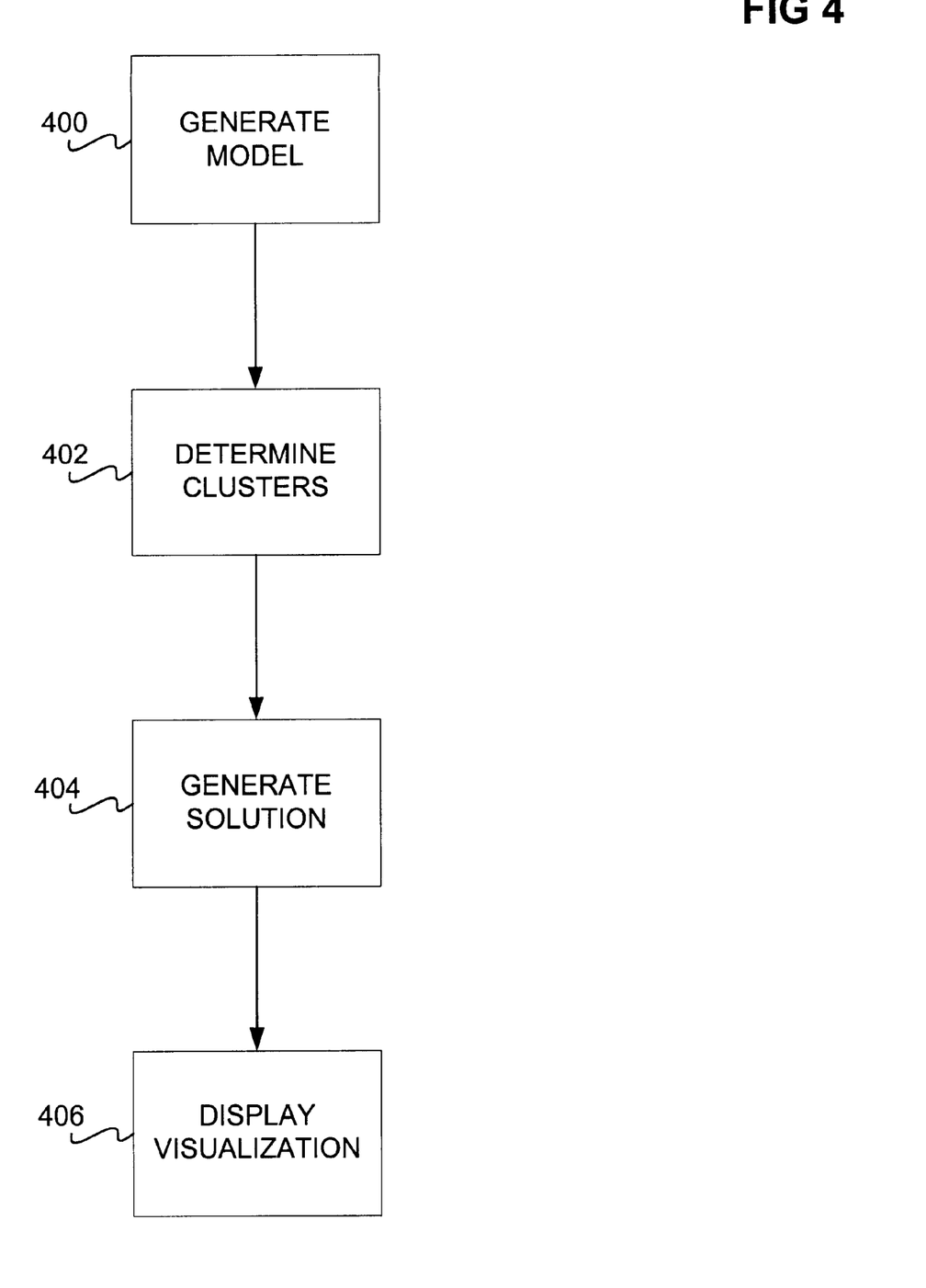
FIG. 4 is a flowchart of a method according to an embodiment of the invention.

Referring to FIG. 4, a flowchart of a method according to an embodiment of the invention is shown. The method is operable on a number of variables that have a predetermined representation, as has been described. The variables include a number of input-only variables, that serve only to predict other variables, a number of output-only variables, that are only predicted and do not serve to predict other variables, and a number of input-and-output variables, that are both used to predict other variables, and are predicted by other variables.

In 400, a model is generated. The model has a bottleneck architecture, as has been described. The model includes a top layer of nodes that includes at least the input-only variables. In one embodiment, the top layer only includes the input-only variables, while in a different embodiment, the top layer also includes the input-and-output variables. The model further includes one or more middle layer of hidden nodes, and a bottom layer of nodes including the output-only variables and the input-and-output variables. Thus, the model can be in varying embodiments at least a probabilistic neural net, and also a Bayesian network. There can be one or more arcs connecting nodes within the model, as has been described. For example, a given arc can connect two nodes within the same layer, or a node within the bottom layer with a node within the top layer.

In 402, clusters are determined from the model. In one embodiment, the clusters are determined as a predetermined partition of cross-product of states of the hidden nodes of the one or more middle layers. In 404, a solution is generated for the model; that is, in one embodiment, parameters for the model are generated. The invention is not limited to a particular approach for generating the solution; such approaches can include utilizing a Monte Carlo approach; utilizing a stochastic gradient approach or an EM approach where the distributions of the variables are differentiable with respect to their parameters; etc.

Finally, in 406, a visualization of the clusters can be displayed. As has been described, this can include displaying a list of values for the input variables, such that an item having a value in the list renders the item as more likely to be in a given cluster. As has also been described, this can also include displaying a list of values for the output variables when an item is in a given cluster. It is noted that 404 and 406 of the method of FIG. 4 are optional, and not required to practice method embodiments of the invention, as can be appreciated by those of ordinary skill within the art.

CONCLUSION

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the claims and equivalents thereof.

We claim:

1. A computer-implemented method operable on a plurality of variables having a predetermined representation, the plurality of variables including a plurality of input-only variables, a plurality of output-only variables, and a plurality of both input-and-output variables, the method comprising: generating a model comprising a bottleneck architecture, the model including a top layer of nodes including at least the plurality of input-only variables, at least one middle layer of discrete hidden nodes, and a bottom layer of nodes including the plurality of output-only variables and the plurality of input-and-output variables; and, determining at least one cluster from the model.

2. The method of claim 1, wherein determining the at least one cluster from the model comprises determining the at least one cluster as a predetermined partition of states of the hidden nodes of the at least one middle layer.

3. The method of claim 1, wherein the top layer of nodes includes only the plurality of input-only variables.

4. The method of claim 1, wherein the top layer of nodes also includes the plurality of input-and-output variables.

5. The method of claim 4, wherein the model comprises a Bayesian network.

6. The method of claim 1, wherein the model comprises a probabilistic neural network.

7. The method of claim 1, wherein the model comprises at least one arc, each arc connecting a pair of nodes within a same layer.

8. The method of claim 1, wherein the model comprises at least one arc, each arc connecting a node within the bottom layer with a node within one of the bottom and the top layers.

9. The method of claim 1, further comprising generating a solution to the model.

10. The method of claim 9, wherein generating a solution to the model comprises utilizing a Monte Carlo approach.

11. The method of claim 9, wherein distributions of the variables are differentiable with respect to parameters of the variables, and generating a solution to the model comprises utilizing a stochastic gradient approach.

12. The method of claim 9, wherein distributions of the variables are differentiable with respect to parameters of the variables, and generating a solution to the model comprises utilizing a Generalized Expectation Maximization (GEM) approach.

13. The method of claim 1, further comprising displaying a visualization of the at least one cluster.

14. The method of claim 13, wherein displaying the visualization of the at least one cluster comprises displaying a list of values for the plurality of input variables, such that an item having a value in the list renders the item more likely to be in a particular cluster.

15. The method of claim 13, wherein displaying the visualization of the at least one cluster comprises displaying a list of values for the plurality of output variables when an item is in a particular cluster.

16. A machine-readable medium having instructions stored thereon for execution by a processor to perform a method operable on a plurality of variables having a predetermined representation, the plurality of variables including a plurality of input-only variables, a plurality of output-only variables, and a plurality of both input-and-output variables, the method comprising:

generating a model comprising a bottleneck architecture, the model including a top layer of nodes including at least the plurality of input-only variables, at least one middle layer of hidden nodes, and a bottom layer of nodes including the plurality of output-only variables and the plurality of input-and-output variables;

determining at least one cluster Corn the model as a predetermined partition of states of the hidden nodes of the at least one middle layer; and, generating a solution to the model.

17. The medium of claim 16, wherein the top layer of nodes includes only the plurality of input-only variables.

18. The medium of claim 16, wherein the top layer of nodes also includes the plurality of input-and-output variables.

19. The medium of claim 16, wherein the model comprises at least one arc, each arc connecting a pair of nodes within a same layer.

20. The medium of claim 16, wherein the model comprises at least one arc, each arc connecting a node within the bottom layer with a node within one of the bottom and the top layers.

21. The medium of claim 16, wherein generating a solution to the model comprises utilizing a Monte Carlo approach.

22. The medium of claim 16, wherein distributions of the variables are differentiable with respect to parameters of the variables, and generating a solution to the model comprises utilizing a stochastic gradient approach.

23. The median of claim 16, wherein distributions of the variables are differentiable with respect to parameters of the variables, and generating a solution to the model comprises utilizing an Expectation Maximization (EM) approach.

24. A machine-readable medium having instructions stored thereon for execution by a processor to perform a method operable on a plurality of variables having a predetermined representation, the plurality of variables including a plurality of input-only variables, a plurality of output-only variables, and a plurality of both input-and-output variables, the method comprising:

generating a model comprising a bottleneck architecture, the model including a top layer of nodes including at least the plurality of input-only variables, at least one middle layer of hidden nodes, and a bottom layer of nodes including the plurality of output-only variables and the plurality of input-and-output variables;

determining at least one cluster from the model;

generating a solution to the model; and, displaying a visualization of the at least one cluster.

25. The medium of claim 24, wherein determining the at least one cluster from the model comprises determining the at least one cluster as a predetermined partition of states of the hidden nodes of the at least one middle layer.

26. The medium of claim 24, wherein the top layer of nodes includes only the plurality of input-only variables.

27. The medium of claim 24, wherein the top layer of nodes also includes the plurality of input-and-output variables.

28. The medium of claim 24, wherein displaying the visualization of the at least one cluster comprises displaying a list of values for the plurality of input-only variables, such that an item having a value in the list renders the item more likely to be in a particular cluster.

29. The medium of claim 24, wherein displaying the visualization of the at least one cluster comprises displaying a list of values for the plurality of output-only variables when an item is in a particular cluster.

30. A computer-implemented method for generating a model from which at least one cluster can be determined there from and operable on a plurality of variables having a predetermined representation, the plurality of variables including a plurality of input-only variables, a plurality of output-only variables, and a plurality of both input-and-output variables, the method comprising:

generating a model comprising a bottleneck architecture, the model including a top layer of nodes including at least the plurality of input-only variables, at least one middle layer of discrete hidden nodes, and a bottom layer of nodes including the plurality of output-only variables and the plurality of input-and-output variables.

31. The method of claim 30, wherein the top layer of nodes includes only the plurality of input-only variables.

32. The method of claim 30, wherein the top layer of nodes also includes the plurality of input-and-output variables.

33. The method of claim 30, wherein the model comprises at least one arc, each arc connecting a pair of nodes within a same layer.

34. The method of claim 30, wherein the model comprises at least one arc, each arc connecting a node within the bottom layer with a node within one of the bottom and the top layers.

* * * * *